United States Patent [19]

King

[11] 4,293,789
[45] Oct. 6, 1981

[54] DYNAMOELECTRIC MACHINE BRUSH RIGGING

[75] Inventor: Dallas E. King, Dayton, Ohio

[73] Assignee: General Motors Corporation, Detroit, Mich.

[21] Appl. No.: 74,387

[22] Filed: Sep. 10, 1979

[51] Int. Cl.³ .......................................... H02K 13/00
[52] U.S. Cl. ..................................... 310/239; 310/42; 310/68 C; 310/71
[58] Field of Search ............................... 310/239–242, 310/245–247, 71, 42, 68 C, 91; 361/26

[56] References Cited

U.S. PATENT DOCUMENTS

| | | | |
|---|---|---|---|
| 2,120,457 | 6/1938 | Beauchamp | 310/68 C |
| 2,339,829 | 1/1944 | Youhouse | 310/68 C |
| 2,894,156 | 7/1959 | Kent | 310/154 |
| 3,441,766 | 4/1969 | Amrein | 310/239 |
| 3,666,990 | 5/1972 | Strobl | 361/26 |
| 3,784,856 | 1/1974 | Preston | 310/239 |
| 4,041,339 | 8/1977 | Huber | 310/239 |
| 4,056,749 | 11/1977 | Carlson | 310/239 |
| 4,109,376 | 8/1978 | Di Liddo | 29/622 |

Primary Examiner—R. Skudy
Attorney, Agent, or Firm—C. R. Meland

[57] ABSTRACT

An end cap assembly for a direct current motor. The assembly includes a brush retainer supported by the end cap that engages spring biased brushes to maintain the brushes in a retracted position. When an armature shaft is assembled to the end cap a portion thereof engages the retainer to move it relative to the end cap to a position where the brushes now engage the commutator of the armature. The retainer becomes a part of the motor. The end cap is formed as a one-piece plastic part that carries metallic brush holders and a circuit breaker. The circuit breaker is connected to one of the brush holders and to a terminal by C-shaped clips.

4 Claims, 6 Drawing Figures

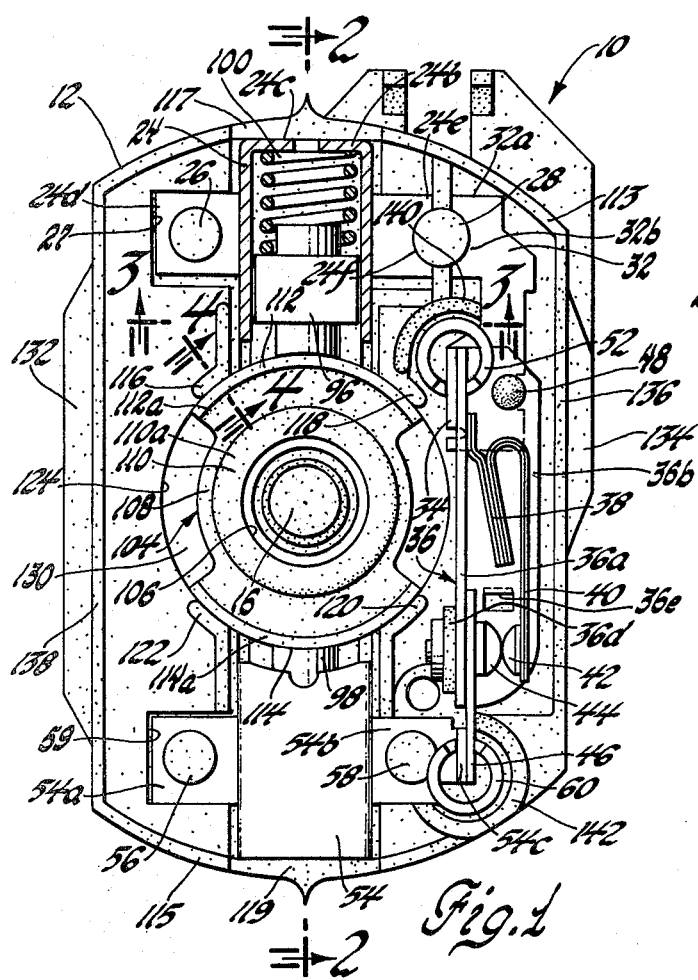
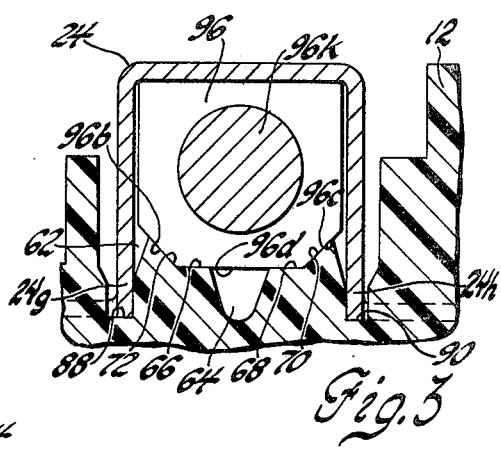
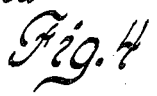
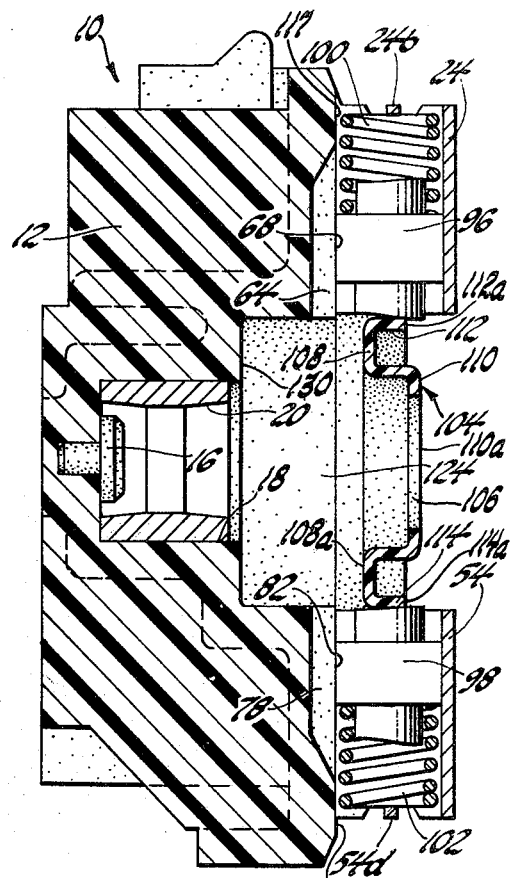
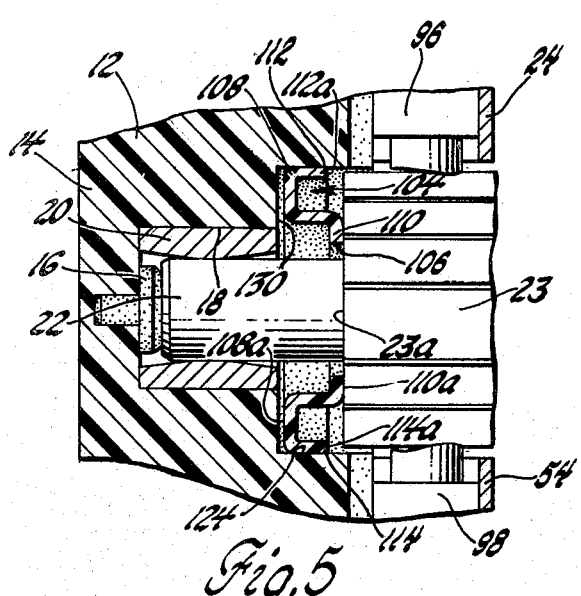

DYNAMOELECTRIC MACHINE BRUSH RIGGING

This invention relates to brush rigging for a dynamoelectric machine and more particularly to brush rigging for direct current motors.

One of the problems encountered in the assembly of a dynamoelectric machine rotor to an end cap or end frame of a dynamoelectric machine, where the end frame carries spring biased brushes that in use engage a current collector of the rotor, is maintaining the brushes in a retracted position out of the way of the current collector device of the rotor as the rotor shaft is inserted into a bearing in the end frame.

One known arrangement for maintaining the brushes of a dynamoelectric machine retracted is disclosed in the patent to Redick et al., U.S. Pat. No. 3,219,860. In this patent a tool is inserted through an opening formed in the end wall of an alternating current generator which passes into a brush holder and which engages the ends of spring biased brushes to maintain them retracted during assembly of the shaft and slip rings to the end frame of the generator.

Another arrangement for maintaining brushes retracted is disclosed in the patent to Barthruff et al., U.S. Pat. No. 3,493,802. In this patent a device is inserted through openings in a brush carrier to maintain the brushes retracted. Other United States patents that relate to brush retracting devices are the patents to Dafler U.S. Pat. Nos. 3,628,075 and Winkelmann 3,739,205.

In contrast to the brush retracting devices disclosed in the above-referenced patents the present invention contemplates providing a dynamoelectric machine end cap assembly wherein an annular brush retainer is fitted to the end cap assembly such that it engages the inner walls of spring biased brushes supported by the end cap to maintain the brushes in a retracted position. When the rotor of the dynamoelectric machine is assembled to the end cap by axially inserting the rotor shaft into an end cap bearing the brush retainer is engaged by a portion of the rotor assembly and is shifted by axial movement of the rotor to a position such that the brushes no longer engage the retainer and as a result the brushes are forced into engagement with the current collector of the rotor. The rotor may be the armature of a direct current motor in which case the current collector is a commutator.

It accordingly is one of the objects of this invention to provide an end cap assembly for a dynamoelectric machine that has a plurality of radially disposed spring biased brushes that are held in a retracted position by a brush retainer that slidably engages the end cap and which can be shifted to a position wherein the brushes engage the current collector of a dynamoelectric machine rotor when the shaft is axially inserted into the end cap. The retainer remains in the dynamoelectric machine end cap and becomes a part of the final assembled dynamoelectric machine.

Another object of this invention is to provide a method of assembling an end cap to a rotor of a dynamoelectric machine wherein the brushes are maintained in a retracted position by an engagement with an axially shiftable brush retainer that is slidably supported by the end cap and wherein the step of inserting the shaft of the rotor of the dynamoelectric machine into the end cap axially shifts the brush retainer out of engagement with the brushes to thereby permit the brushes to slide into contact with a current conducting means of the rotor.

Still another object of this invention is to provide an end cap assembly for a dynamoelectric machine which is adapted for high volume automated assembly of dynamoelectric machines. In carrying this object forward the end cap assembly is comprised of a one-piece molded part to which are attached brush holders that form with the one-piece part brush holding chambers for guiding the brushes in their radial movement. The brush holders are formed of a conductive material and have tabs that are bent over into contact with one end of a brush spring the opposite end of which engages a brush. The spring serves the dual function of urging the brushes into contact with the commutator of the armature and also serves as a conductor electrically connecting the conductive brush holder to the brush thereby eliminating brush shunts. The brush holders are preferably secured to the one-piece end cap by staking over portions of the end cap into engagement with the brush holders and at least one of the brush holders has an integral male terminal projecting through an opening in the end cap for connection to a female terminal. Another male terminal that projects through the end cap is provided and it is electrically connected to one end of a circuit breaker assembly. The circuit breaker assembly and the last-mentioned male terminal have engaged flange portions to make an electrical connection therebetween and are clamped together by a C-shaped clip.

IN THE DRAWINGS

FIG. 1 is an end view of an end cap assembly for a dynamoelectric machine made in accordance with this invention;

FIG. 2 is a sectional view taken along line 2—2 of FIG. 1 and illustrating the position of the brush retainer when it is maintaining the brushes in a retracted position;

FIG. 3 is a sectional view taken along line 3—3 of FIG. 1;

FIG. 4 is a sectional view taken along line 4—4 of FIG. 1 and illustrating on an enlarged scale a rib that engages the brush retainer when it is in the FIG. 2 position;

FIG. 5 is a view illustrating the shaft and commutator of the dynamoelectric machine armature as assembled to the end cap and illustrating the position of the brush retainer after assembly.

Figure 6:
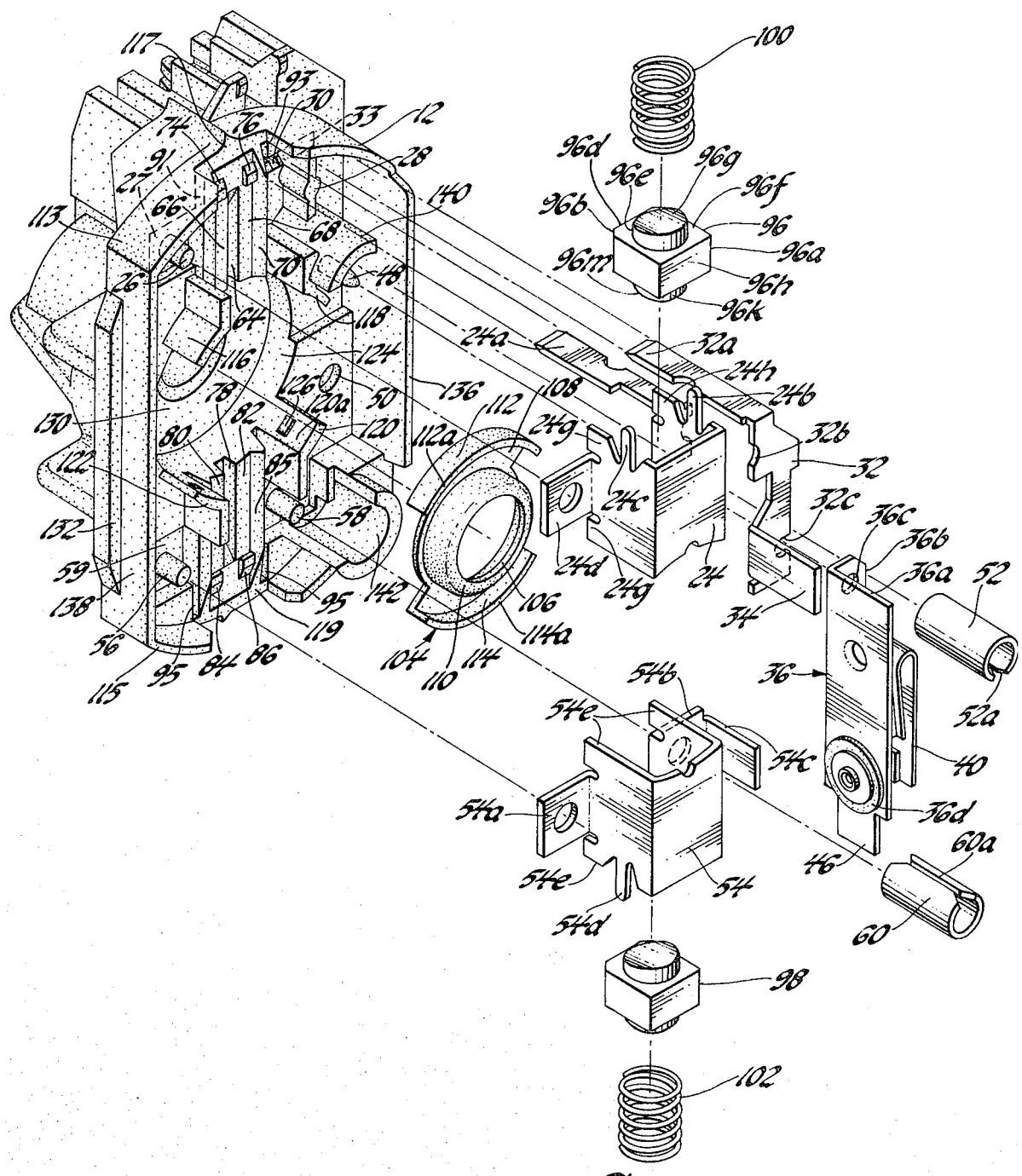
FIG. 6 is an exploded perspective view illustrating the parts that make up the end cap assembly shown in FIG. 1.

The brush holding arrangement of this invention is disclosed hereinafter for use on a direct current motor of the type that has an armature that includes a commutator and a permanent magnet field comprised of permanent magnets carried by the frame of the motor. It is to be understood, however, that the brush holding arrangement can be used with various types of dynamoelectric machines that utilize brushes that engage rotary current conductors such as a commutator.

Referring now to the drawings, the reference numeral 10 generally designates an end cap assembly for a direct current motor. This end cap assembly carries brush holders and spring biased brushes and also a protective circuit breaker, all of which is more fully described hereinafter. The end cap assembly forms the end housing of the direct current motor and comprises a one-piece molded plastic end cap 12 which is depicted in FIGS. 1 and 6. This end cap may be formed, for example, from a thermoplastic polyester insulating material and is molded to the shape illustrated in FIGS. 1 and 6.

The entire armature of the direct current motor has not been illustrated since it is conventional. This armature includes an armature shaft 22 that carries a commutator 23. The commutator can take various known forms in which the commutator bars are connected to an armature winding that is wound in slots formed on a laminated magnetic core carried by shaft 22 and the commutator may be of a type wherein the bars are supported by a spool of insulating material carried by the shaft and wherein the bars have hooks or tangs connected to the armature winding. Commutators of this type are disclosed in the abovereferenced Dafler U.S. Pat. No. 3,628,075 and in the U.S. Pat. No. 4,041,339 to Huber.

The end cap 12 of the direct current motor is secured to a housing (not illustrated) that extends axially therefrom and which encloses the armature of the motor. This housing carries permanent magnets which provide the field for the motor and carries a bearing for supporting the opposite end of the armature shaft in a known manner.

As seen in FIG. 5, the end wall portion 14 of the end cap 12 is provided with a bore that receives a cylindrical portion of a thrust plug 16 that forms a thrust bearing for one end of the shaft 22 of the armature of the direct current motor. The thrust plug 16 is formed of a plastic bearing material, for example a lubricated polyamide-imide. In addition, the end cap 12 has a central bore 18 which is fitted with a sintered bronze bearing 20. When the armature of the direct current motor is assembled to the end cap assembly 10 the shaft 22 of the armature is inserted into the bearing 20 and against the end of the thrust plug 16.

The end cap 12 carries the parts in the final assembly which are shown in the exploded perspective view of FIG. 6. A brush holder and terminal designated by reference numeral 24 is assembled to cap 12. This brush holder and terminal is formed of a metallic conductive material, such as brass, and has three walls forming a U-shaped brush retaining structure and has an integral male terminal 24a. The brush holder and terminal 24 further has integral tabs 24b and 24c which, as will be described, are bent over into contact with the end of a brush spring to retain the brush spring. The brush holder and terminal 24 has a laterally extending flange portion 24d which has an opening that receives a stud 26 formed integral with the end cap 12 when the part 24 is assembled to the end cap 12. The stud 26 is bounded by a recess 27 that receives the portion 24d. Further, the part 24 has a laterally extending flange 24e shown in FIG. 1 having an arcuately extending wall 24f which partially encompasses an integral stud portion 28 of the end cap 12 when part 24 is assembled to the end cap. The male terminal 24a passes through a slot 30 formed in the end cap 12 so that it is accessible to the exterior of the end cap 12 when the part 24 is assembled thereto. With the part 24 assembled to the end cap 12 the stud 26 is headed or staked over into contact with flange 24d to securely fasten the part 24 to the end cap 12.

The end frame assembly 10 further includes a terminal generally designated by reference numeral 32 formed of a conductive metallic material such as brass. This terminal has a male terminal portion 32a which projects through another opening 33 formed in the end cap 12. The terminal 32 has a flanged portion 34 which is electrically connected to a circuit breaker assembly generally designated by reference numeral 36 in a manner to be described. Further, the terminal 32 is formed with an arcuately extending wall 32b which partially encompasses the right side of the stud 28 as illustrated in FIG. 1 and an arcuately extending wall 32c that partially encompasses end cap part positioning stud 48 which has a pointed end. The terminal 32 is assembled to the end cap 12 by pushing the male terminal 32a through an opening 33 in the end cap 12. The stud 28 is subsequently staked over the terminal 32 and the flange 24e of part 24 to thereby secure both the terminal 32 and the right side of the part 24 to the end cap 12. It is pointed out that the male terminals 24a and 32a extend to the exterior of the end cap 12 and are adapted to be connected with a female terminal connector.

The end cap assembly has a motor protecting circuit breaker generally designated by reference numeral 36. This circuit breaker assembly includes a base plate portion 36a formed of electrically conductive material and extending therefrom is a flange 36b. The base portion 36a carries a bimetal strip 38 secured to another bimetal strip 40 which carries an electrical contact 42. The contact 42 engages a fixed contact 44 supported by the base 36a and is electrically insulated therefrom by insulating washers disposed on opposite sides of base 36a, one of which is illustrated and designated as 36d. Insulating arrangements of this general type are disclosed in the patent to Dafler et al., U.S. Pat. No. 3,718,162. In addition, the circuit breaker 36 has a connector portion 46 formed of electrically conductive material which is electrically connected to contact 44.

In assembling the circuit breaker assembly 36 to the end cap 12 the opening 36c, formed in the flange 36b, receives the part positioning stud 48 integral with the end cap 12 with the flange 36b overlapping the portion of terminal 32 bounding opening 32c. Further, the portion 36b has an outwardly struck tang 36c which fits within a circular recess 50 formed in the end cap 12. It should be noted that when the circuit breaker assembly is assembled to the end cap one end of the base plate portion 36a engages the right side of flange 34 of the terminal 32 as shown in FIG. 1. The stud 48 is not staked over and serves to position parts 32 and 36 during assembly to end cap 12.

The end of the base plate portion 32a is maintained in tight engagement with the flange 34 by the C-shaped clip 52. This clip is formed of an electrically conductive material, for example a brass material, and when it is assembled, as shown in FIG. 1, the wall defining the slot 52a tightly engages the flange 34 and one wall of the end of the base portion 36a to clamp these parts together.

The lower end of the circuit breaker assembly 36 is connected to the brush holder 54 which is formed of a conductive metallic material such as brass. As is illustrated in FIG. 6, the brush holder 54 is generally U-shaped and has apertured flange portions 54a and 54b. A connector portion 54c extends from the apertured flange 54b. The brush holder 54 further has integral tabs 54d only one of which is illustrated in FIG. 6. The other tab portion is identical with tab 54d and is arranged like tab 24b of brush holder 24. In the assembly of the brush holder 54 to the end cap 12 the integral end cap studs or projections 56 and 58 of the end cap pass through the openings formed in the flange portions 54a and 54b. The flanges are received in recesses formed in the end cap, one of which is designated by reference numeral 59. The studs 56 and 58 are then staked over such that material of these studs flows over the flanges 54a and 54b to securely fasten the brush holder 54 to the end cap 12. It can be seen, from FIG. 1, that the flange 54c engages the connector portion 46 of the circuit breaker assembly 36. This connector portion is maintained in tight engagement with the flange 54c when another C-shaped clip 60 is assembled such that the walls defining the slot 60a engage opposite sides of the flange 54c and the connector 46 to maintain them tightly clamped together. The clip 60 is formed of an electrically conductive material and may be of the same material as the clip 52.

When the brush holders 24 and 54 have been secured to the end cap 12 they form a brush guiding and retaining chamber designated by reference numeral 62 shown in the sectional view of FIG. 3. It is seen, from FIGS. 3 and 6, that the end plate 12 has a radially extending groove 64 bounded by two planar brush supporting surfaces 66 and 68. The planar surface 68 merges into a slanted surface 70 and the planar surface 66 merges into another slanted surface 72. The ends of surfaces 68 and 70 are formed with ribs 74 and 76 (FIG. 6) which serve to help maintain a brush within the chamber 62 when the brush is assembled to the brush holder.

The end cap 12 has another radially extending groove 78, a pair of planar brush guiding surfaces 80 and 82, ribs 84 and 86 and slanted surfaces, like surfaces 70 and 72, one of which is illustrated in FIG. 6 and designated by reference numeral 85. The cross section of the lower brush retaining area, which has just been described, of the end cap is the same as the upper portion which is illustrated in FIG. 3.

It is seen in FIG. 3 that the end cap 12 has grooves or channels 88 and 90. Further, with reference to FIG. 6, it is seen that brush holder 24 has portions 24g disposed on opposite sides of flange 24d. The brush holder 24 has portions 24h, one of which is visible in FIG. 6 which are disposed on opposite sides of flange 24c shown in FIG. 1. When brush holder 24 is assembled to end cap 12, a pair of sections 24g and 24h fit into channels 88 and 90 as depicted in FIG. 3. Further, the other pair of sections 24g and 24h fit into channels or recesses 91 and 93.

In a similar fashion, the brush holder 54 has four sections 54e, three of which are visible in FIG. 6, that fit into channels formed in the lower end of end cap 12 which are the same as channels 88, 90, 91 and 93 formed in the upper end thereof. These channels are identified by reference numeral 95.

The brushes for the dynamoelectric machine are designated by reference numerals 96 and 98 which are formed of a suitable carbon-copper composition. Since the brushes are identical only the configuration of the brush 96 will be described in detail. The brush 96 has a central section 96a having four flat surfaces. Further, the brush 96 has chamfered or slanted surfaces 96b and 96c which are illustrated in FIG. 3. It can be seen that the flat wall 96d of the brush 96 slidably engages planar surfaces 66 and 68 of the end cap 12 whereas the slanted surfaces 96b and 96c of the brush 96 respectively engage slanted surfaces 72 and 70 of the end cap 12. The brush 96 further has an annular portion 96e of reduced cross section as compared to the central portion 96a of the brush to form therewith a surface 96f which engages a brush spring. The end surface 96g of the brush 96 is concave or curved to fit the annular surface of the commutator 23. Further, this concave surface is slanted such that the portion of 96e that is located adjacent the face 96h has a larger axial dimension than the portion facing the end face 96d. Putting it another way, the concave surface slants such that the axial extent of portion 96e is less over an area facing the end plate 12. The brush 96 has another cylindrical portion 96k which is identical to 96e and which has an end surface 96m that engages the commutator. The surface 96m is identical to surface 96g and the brush can therefore be inserted into the brush holder in either direction. Further, due to the provision of the complementary slanted surfaces on the brush and end cap 96b and 72 and 96c and 70 the brush can only be assembled to the brush holder in one rotative position. This ensures that the brush surface that engages the commutator will always be properly oriented with respect thereto. The brush 98 is in all respects identical with brush 96 and therefore is not described in detail.

Each brush is spring biased into engagement with the commutator 23 by brush springs designated by reference numerals 100 and 102 that are formed of beryllium copper wire. The brush springs serve the dual function of biasing a brush into engagement with the commutator of the dynamoelectric machine and form an electrical connection between a brush holder and a brush.

The end frame 12 carries a brush retainer 104 which is formed of a resilient plastic material, for example nylon. This retainer has a central opening 106, annular portions 108 and 110 and two arcuately extending portions 112 and 114. The end wall 110a of portion 110 extends axially beyond the edges 112a and 114a of portions 112 and 114. Prior to assembly of the brush retainer 104 to the end cap 12 the arcuate portions 112 and 114 flare outward slightly and are sprung back to a position shown in FIG. 2 when the retainer is assembled to the end cap. When the retainer is assembled to the end cap the portions 112 and 114 tightly engage annular portions of the end cap 12. The brush retainer 104 is initially assembled to the end cap 12 by forcing the outer walls of portions 112 and 114 into contact with the internal walls of integral ears or flange portions 116, 118, 120 and 122 of the end cap 12. The internal walls, for example the inner wall 120a of ear or flange 120, merges smoothly into annular walls 124 of the end cap 12. This is true for all of the inner surfaces of the four flanges or ears 116–122. Further, each inner wall of a flange or ear is provided with a rib 126 which is shown in the enlarged sectional view of FIG. 4. This rib has an annular wall 126a which engages the end 108a of annular portion 108 of the brush retainer when it is assembled to the end cap 12. The rib 126 further has surface 126b that slants as shown in FIG. 4. The ribs 126 have a small radial dimension which may be, for example, approximately 0.25 millimeters.

The method of assembling the brushes to the end cap 12 and for assembling the armature of the motor to the end cap 12 will now be described. Assuming that the brush holders have been assembled to the end cap 12, the brush retainer 104 is press fitted to the internal walls of the flanges 116–122 such that areas of the outer wall of portion 112 engage, respectively, the inner walls of ears 116 and 118 and areas of the outer wall of portion 114 engage, respectively, the inner walls of ears 120 and 122. Further, the wall 108a of the retainer engages the rib walls 126a. This assembled position of the brush retainer is illustrated in FIG. 2 and in this position the outer walls of portions 112 and 114 tightly engage the inner walls of the ears. The brushes 96 and 98 are now inserted into the brush holders from the outside. The brush springs 100 and 102 are now inserted into the brush holders from the outside such that one end of the brush spring encompasses a cylindrical portion of the brush for example 96e with the end of the spring engaging a flat surface, for example 96f. The brush spring is now compressed and the tabs, for example tabs 24c and 24b, are then bent over to engage an opposite end of a brush spring. This can be accomplished by a tool which engages the end of a spring and which has a pair of slots permitting access to the tabs for bending the tabs over as the spring is held compressed by the tool. In FIGS. 1 and 2 the tabs are shown bent into engagement with one end of a brush spring and they now serve to retain a brush spring in its assembled position where it urges a brush radially inward. The inner ends of the brushes engage the brush retainer 104 to maintain the brushes retracted. It will be observed, from an inspection of FIGS. 1 and 6, that the end walls 113 and 115 of end cap 12 have openings 117 and 119 which permit the brushes and brush springs to be passed therethrough during assembly of the brushes and springs into the brush holders. At this point in the assembly of a direct current motor the end cap assembly 10 has brushes installed and the brush retainer 104 is maintaining the brushes in a retracted position. A number of these end cap assemblies can be manufactured at one station or area of a production plant and stored for subsequent assembly to the armature of the direct current motor.

When it is desired to assemble an armature of the direct current motor to a completed end cap assembly 10, the armature shaft 22 is inserted through the opening 106 in the brush retainer 104 by relative axial movement between the end cap 12 and armature shaft 22. Assuming the end cap assembly 12 to be in a fixed position the shaft 22 is axially moved toward the bearing 20 so as to be eventually inserted therein and during this movement an end wall 23a of the commutator 23 will become engaged with the end wall 110a of portion 110 of the brush retainer 104. As the shaft of the armature continues to move relative to the end cap to its final assembled position within the bore of bearing 20 it will push the brush retainer from the position shown in FIG. 2 to the position shown in FIG. 5. Thus, the brush retainer will be slid past and over the ribs 126 and will be slid into the annular bore wall 124 to the position shown in FIG. 5. As the outer walls of portions 112 and 114 of the brush retainer 104 move out of contact with the inner ends of brushes 96 and 98 they will be forced into engagement with the commutator 24 by the brush springs.

In the final position of the brush retainer 104, the wall 108a is slightly spaced from the annular bore wall 130. It of course will be appreciated that the relative dimensions of the parts must be such that the retainer is shifted out of contact with the brushes 96 and 98 when the end of the shaft 22 is fully inserted into the bearing 20. The length of shaft 22, between its end that engages thrust plug 16 and the end 23a of the commutator 23 and the length of commutator 23, is such that the brushes engage the commutator substantially midway its length. The brush retainer 104 remains in the direct current motor and therefore forms a component part of the motor once the armature shaft has been assembled to the end frame.

It should be noted that all that is required in order to shift the brush retainer 104 relative to the end cap and to the FIG. 5 position is relative motion between the armature shaft and the end cap. Thus, instead of holding the end cap fixed and moving the armature shaft into the fixed end cap it is possible to hold the armature fixed and move the end cap relative thereto in order to cause the brush retainer to be shifted from the position shown in FIG. 2 to the position shown in FIG. 5. It will be appreciated that during the shiftable movement of the retainer 104 it is slidably supported by the inner walls of the end cap and is tightly retained in the final position of FIG. 5 by the tight engagement between the arcuate portions 112 and 114 of the brush retainer and the internal annular bore wall 124.

In order to simplify the description of the invention it is pointed out that the sectional view of FIG. 2 does not depict all of the parts of the end cap. Thus, the circuit breaker and various other elements have not been depicted in FIG. 2 it being understood, however, that the brush retainer 104, in the FIG. 2 position, is engaging the inner walls of ears 116–122 and is in engagement with the ribs 126 as shown in FIG. 4.

As previously mentioned, the end cap is secured to a tubular motor frame. The particular end cap disclosed herein has a pair of walls 132 and 134 which are adapted to engage the ends of a steel motor frame (not illustrated) which engages walls 113, 115, 136 and 138. This end frame can be secured to the outer walls of the end cap 12 by staking over tangs (not illustrated) of the frame to the rear wall of the end cap 12.

In regard to the brush springs 100 and 102 providing an electrical connection between the metallic brush holders and the brushes, the tangs for example tangs 24b and 24c, make an electrical connection to the end of a brush spring. Moreover, certain of the sides of the brush springs, when a brush spring is compressed, tend to engage an internal wall of the U-shaped portion of a brush holder to further provide an electrical connection between a brush spring and a brush holder. This is due to a slight bowing of a brush spring after assembly.

The end cap 12 has two axially extending semi-circular portions 140 and 142 which are partially disposed about the C-shaped clips 52 and 60 when they are assembled to the end cap assembly.

The embodiments of the invention in which an exclusive property or privilege is claimed are defined as follows:

1. An end cap assembly for a dynamoelectric machine comprising, an end cap having bearing means adapted to receive the shaft of a dynamoelectric machine rotor, at least one brush holder extending radially of said end cap, a brush slidably supported by said brush holder, resilient means for urging said brush radially of said end cap, and an annular brush retainer having outer wall means engaging and slidably supported by internal wall means of said end cap for movement axially of said end cap, said retainer having a central opening, said internal wall means of said end cap extending axially of said bearing means, a portion of the outer wall means of said brush retainer engaging an end of said brush to hold said brush in a retracted position against the force of said resilient means, said brush retainer being axially movable toward said bearing means along said internal wall means by engagement with a dynamoelectric machine rotor when the shaft of the rotor is inserted through said central opening in said retainer and into said bearing means to thereby move said brush retainer to an assembled position in contact with said internal wall means and out of engagement with the end of said brush to permit said brush to contact a rotary current conducting means of said dynamoelectric machine rotor.

2. An end cap assembly for a dynamoelectric machine comprising, an end cap having bearing means adapted to receive the shaft of a dynamoelectric machine rotor, at least one brush holder extending radially of said end cap, a brush slidably supported by said brush holder, resilient means for urging said brush radially of said end cap, an annular bore formed in said end cap having an annular wall open to said bearing means, a plurality of flange portions extending axially of said bore having inner arcuately extending walls substantially aligned with said annular wall, the inner wall of each flange portion having rib means, and an annular brush retainer having outer wall means engaging said inner walls of said flange portions and engaging said rib means, said retainer having a central opening, at least a portion of the outer wall means of said brush retainer engaging an end of said brush to hold said brush in a retracted position against the force of said resilient means, said brush retainer being axially movable toward said bearing means and into contact with said annular wall of said bore by engagement with a dynamoelectric machine rotor when the shaft of the rotor is inserted through said central opening in said retainer and into said bearing means to thereby move said brush retainer past said rib means to an assembled position in contact with said annular wall and out of engagement with the end of said brush to permit said brush to contact a rotary current conducting means of said dynamoelectric machine rotor.

3. An end cap assembly for a direct current motor comprising, a one-piece end cap formed of insulating material, first and second metallic brush holders each having a generally U-shaped brush retaining portion supported by said end cap, said first metallic brush holder having an integral first male terminal extending axially through an opening in said end cap, a terminal member having a second male terminal extending through an opening formed in said end cap adjacent said first male terminal, said terminal member having an integral axially extending flange, a stud integral with said end cap staked into engagement with a portion of said first brush holder and a portion of said terminal member for securing said first brush holder and terminal member to said end cap, said second brush holder having an integral axially extending flange substantially aligned with said axially extending flange of said terminal member, a circuit breaker assembly having planar end portions engaging respectively the flange on said terminal member and the flange on said second brush holder, and a C-shaped clip located at each end of said circuit breaker assembly and contacting respectively a flange and a planar end portion of said circuit breaker assembly for clamping said circuit breaker assembly to said flanges.

4. An end cap assembly for a direct current motor comprising, a one-piece end cap formed of insulating material, first and second electrically conductive metallic brush holders each having a generally U-shaped brush retaining portion supported by said end cap, said U-shaped portions and said end cap defining brush retaining chambers, said first metallic brush holder having an integral first male terminal extending axially through an opening in said end cap, a terminal member having a second male terminal extending through an opening formed in said end cap, said terminal member having an integral axially extending flange, a stud integral with said end cap staked into engagement with a portion of said first brush holder and a portion of said terminal member for securing said first brush holder and said terminal member to said end cap, said second brush holder having an integral axially extending flange substantially aligned with said axially extending flange of said terminal member, a circuit breaker assembly having planar end portions engaging respectively the flange of said terminal member and the flange on said second brush holder, a C-shaped clip located on each end of said circuit breaker assembly and contacting respectively a flange and a planar end portion of said circuit breaker assembly for clamping said circuit breaker assembly to said flanges, a brush disposed in each brush holder, and a brush spring engaging a respective brush at one end thereof and engaging bent over integral tabs of said brush holder at the other end thereof, each brush spring adapted to urge a brush radially into contact with a rotary element of a dynamoelectric machine and serving to electrically connect a metallic brush holder to a brush.

* * * * *